United States Patent [19]

Lee et al.

[11] Patent Number: 5,106,917
[45] Date of Patent: Apr. 21, 1992

[54] PEELABLE LIDSTOCK BASED ON POLYBUTYLENE BLOCK COPOLYMER BLENDS

[75] Inventors: Robert W. Lee, Houston; Charles C. Hwo, Sugarland, both of Tex.

[73] Assignee: Shell Oil Company, Houston, Tex.

[21] Appl. No.: 486,561

[22] Filed: Feb. 28, 1990

[51] Int. Cl.⁵ .............................................. C08L 33/06
[52] U.S. Cl. ...................................... 525/229; 525/98
[58] Field of Search ................... 525/229, 98

[56] References Cited

U.S. PATENT DOCUMENTS

| | | |
|---|---|---|
| Re. 27,145 | 6/1971 | Jones . |
| 2,480,998 | 9/1949 | Brackett . |
| 3,197,452 | 7/1965 | Natta et al. . |
| 3,362,940 | 1/1968 | Edwards et al. ............... 260/88.2 |
| 3,595,942 | 7/1971 | Wald ............................ 260/880 |
| 3,879,492 | 4/1975 | Bontinick ...................... 525/227 |
| 4,111,895 | 9/1978 | Gergen .......................... 260/42.18 |
| 4,414,053 | 11/1983 | Karen .......................... 156/308.2 |
| 4,539,263 | 9/1985 | Hoh ............................. 428/500 |
| 4,550,141 | 10/1985 | Hoh ............................. 525/221 |
| 5,019,072 | 5/1991 | Polski .......................... 525/98 |

FOREIGN PATENT DOCUMENTS 6507546 6/1965 Netherlands .

Primary Examiner—Edith L. Buffalow
Attorney, Agent, or Firm—James O. Okorafor

[57] ABSTRACT

A blend of butene-1 homopolymer or copolymer, styrenic olefinic block copolymer and optionally polypropylene or use in an easy-open, peelable lid structure for rigid containers, wherein the general range for composition of the blend is 5-50% by weight of butene-1 homopolymer or copolymer, 50-95% by weight of the block copolymer, and 0 to 30 percent by weight polypropylene.

11 Claims, No Drawings

PEELABLE LIDSTOCK BASED ON POLYBUTYLENE BLOCK COPOLYMER BLENDS

BACKGROUND OF THE INVENTION

A highly conventional and widely used method of packaging utilizes a peelable laminated lid material which has been adhered to a rigid container. The lid material is typically made from a backing material coated with a heat sealable material which can be easily peeled. The backing material may be any material strong enough to close said container and also to provide any barrier properties which may be needed. The backing material may be for example; metal foil, polypropylene film, polyester film, nylon film, paper, etc. In many instances, it is desirable to open the package by peeling off the lid material, and this must generally be done without destroying the integrity of the film itself. Accordingly, to provide a satisfactory package of this type, a balance of properties is necessary, i.e. the seal strength must be adequate to maintain the package in a closed and protective condition, while also exhibiting release properties as will permit opening by peeling when desired. In the past there has been no inexpensive effective means to use peel seal closures with rigid styrenic containers or with PVC-based containers because a single peelable adhesive could not be used with olefinic rigid containers as well as styrenic and PVC based containers.

The invention relates to blends, and a method for making a blend usable in a flexible film package made from films and/or laminates and rigid containers using said film or laminate as a closure. Seals produced from these heat-sealable films and/or laminates are characterized by an adequate, nearly constant peel strength when used on rigid containers including styrenic containers and PVC containers. The seals can be formed over a wide range of heat seal temperatures and are easily peelable. The term peelable refers to a film having seal failure occur primarily at the interface of the sealing surfaces, rather than film tearing. The blends, films and/or laminates of the present invention permit the manufacture of a seal which will adhere to a variety of substrates including styrenic, PVC, and olefinic rigid containers.

Most of the commercial peel seal materials are polyolefin based copolymers that can not be used for polystyrene or PVC containers since there is no adhesion between these two types of polymers.

At the present time, in order to use the easy open, peelable lid concept on polystyrene or PVC rigid containers, the manufacturer must coextrude polystyrene with high density polyethylene (HDPE) to form the containers so that the HDPE surface can be sealed with peel seal material. This is a costly process.

One type of peel seal material currently available for polystyrene containers is ethylene/vinyl acetate (EVA) based liquor. The process involves venting and recovering of organic solvent and EVA often produces organoleptic problems in food which is packaged in such containers.

A variety of references teach heat sealable films capable of forming peel seals, such as U.S. Pat. Nos. 4,550,141; 4,539,263; 4,414,053 and 3,879,492. However, none of these references appear to teach a composition which will perform as a peelable seal to rigid styrenic, PVC, or olefinic containers.

The instant invention is a novel blend, method of making a film and a peel sealable package which creates chemically compatible backing materials and peelable sealants useful for polystyrene, PVC, or olefinic containers. The invention thus provides a blend which will provide a peelable seal which can be used on a wide variety of rigid containers which in the past required two or more peelable seal compositions.

SUMMARY OF THE INVENTION

A new composition of matter for producing a peelable heat seal between substrates on which it is carried, comprising a blend of:
  (a) about 5.0 to about 50.0 weight percent of polybutylene homopolymer or copolymer having a melt index of about 0.1 to about 500;
  (b) about 50 to about 95 weight percent of a styrenic olefinic block copolymer;
  (c) 0 to about 30 percent by weight polypropylene; and wherein film made from said blend, when laminated between a backing material and a rigid container at a heat sealing temperature of between about 350° F. and about 450° F. as determined at sealing jaws, affords a peel strength of between about 0.4 to about 5 pounds per inch between the backing material and the rigid container.

A laminated film adapted for producing lidding material said film being a laminate of a backing material and a heat sealing blend, said blend comprising:
  (a) about 5 to about 50 weight percent of polybutylene having a melt index of about 0.1 to about 500;
  (b) about 50 to about 95 weight percent of a styrenic olefinic block copolymer;
  (c) 0 to about 30 percent by weight polypropylene; and wherein said film has utility for achieving a peel strength of between about 0.4 pounds to about 5 pounds per inch when heat sealing occurs at a temperature in the range between about 350° F. and about 450° F. as determined at the sealing jaws.

A new sealable rigid styrenic or PVC package comprising a rigid sytrenic or PVC container having a lid sealed with a film or laminate containing a heat sealing blend, said blend comprising:
  (a) about 5 to about 50 weight percent of polybutylene having a melt index of about 0.1 to about 500; and
  (b) about 50 to about 95 weight percent of a styrenic olefinic block copolymer;
  (c) 0 to about 30 percent by weight polypropylene; and wherein said film has utility for achieving a peel strength of between about 0.4 pounds to about 5 pounds per inch when heat sealing occurs at a temperature in the range between about 350° F. and about 450° F. as determined at the sealing jaws.

DETAILED DESCRIPTION OF THE INVENTION

The present invention comprises a two-component blend of butene-1 homopolymer or copolymer and styrenic-olefinic block copolymer which, when laminated with e.g. aluminum foil yields an easy open, peelable lid material for styrenic, PVC, or olefinic rigid containers.

The laminated film made from said blend can be heat sealed onto PVC, crystal polystyrene, or impact modified polystyrene or olefinic containers. The lid stock made from said blend has a broad heat seal temperature range. Applicants have found that the composition can comprise from about 5 percent to 50 percent by weight of butene-1 homopolymer or copolymer, 50 percent to 95 percent by weight of styrenic-olefinic block copolymer, and 0 to about 30 weight percent polypropylene.

More preferably, the composition comprises from about 20 percent by weight to about 40 percent by weight of the butene-1 homopolymer or copolymer, from about 60 percent by weight to about 80 percent by weight of the styrenic-olefinic block copolymer, and 0 to about 30 weight percent polypropylene.

Most preferably, the composition comprises from about 25 to about 35 percent by weight of the butene-1 homopolymer or copolymer, from about 65 to about 75 percent by weight of the styrenic-olefinic block copolymer, and 0 to about 30 weight percent polypropylene.

The polymer mixtures may be formed into oriented or unoriented films by casting or film blowing methods. After fabrication the laminate can be heat sealed by sealing jaws at a preset temperature, pressure and dwell.

These manufacturing techniques apply to film, although this invention may also apply to sheeting. Film refers to shaped plastics that are comparatively thin and have a maximum thickness of 0.010 inches (10 mils). Sheeting is a shaped plastic having a thickness greater than 0.010 inches.

The present invention may also comprise the coating layer of a laminated structure which comprises polystyrene as the backing material. The peel seal coat, which consists of a mixture of polybutylene, and styrenic-olefinic block copolymer, would be coated or laminated onto the backing material selected.

The laminate can be made by making two separate films that are then laminated. The films may be prefabricated by either film blowing (melt extrusion with a circular die) or the casting method (a flat die-melt extrusion process). Melt extrusion with a flat die (casting) may be accomplished for thermoplastic polymers by using a flat die or slot die.

The laminate can be prepared by any suitable means, such as heat lamination or coextrusion. Coextrusion techniques that can be used for the preparation of the instant film include those described in detail in U.S. Pat. No. 2,480,998.

The extrusion process starts with a polymer in a form that can be fed continuously into an extruder by means of a screw or pneumatic tube. Sometimes the polymers are combined with materials such as plasticizers, lubricants, stabilizers, and colorants by means of Banbury mixers. The resulting mix is extruded through rod shaped dies and chipped into pellets. Pelletized polymer is fed into a screw conveyer into the end of a screw-type extruder and is heated and made into viscous fluid in a cylinder by means of a revolving, helical screw. The sheet emitting from the die may be quenched on a temperature controlled chill roll. Finished films may be subject to a two-way stretching using continuous tenter-frame operations in biaxial orientation.

The term polybutylene refers to polymers of butene-1 homopolymer and butene-1 copolymer such as butene-1-ethylene and butene-1-propylene.

The polybutylene which is a basic component of the blends of this invention is a product of such a stereospecific polymerization procedure and is referred to as an "isotactic" or "stereospecific" polymer in that the repeating units of its polymeric chain all possess the same stereochemical configuration along the chain. This is to be contrasted with "atactic" polymers wherein the repeating units of the polymeric chain vary in a random configuration along the chain. The stereochemical nature of the isotactic polybutylene required for use in novel adhesives may be readily observed from the following structural depiction thereof:

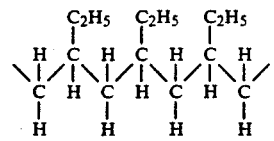

The high molecular weight, isotactic polybutylenes utilized in the novel compositions of this invention are prepared by the stereospecific polymerization of monomeric butene-1. Methods for conducting such polymerization procedures are well known to those skilled in the art; typical procedures being disclosed in U.S. Pat. No. 3,197,452, issued July 27, 1965, and in Dutch application No. 6507546, published Dec. 16, 1965. These procedures generally involve the use of polymerization initiators or catalysts for the polymerization of the monomeric butene-1 to polymers of high molecular weight. Among the preferable catalytic systems utilized in such procedures are the reaction products of metal alkyl compounds, such as aluminum triethyl, and a heavy metal compound, such as the trihalides of Groups IV-VI metals in the Periodic Table, e.g. titanium, vanadium, chromium, zirconium, molybdenum and tungsten, etc. The formation of polymers exhibiting substantial isotactic properties as well as the variations in the molecular weight thereof will thus depend on the nature of the polymerization catalyst, the nature of the co-reactants in the system and the reaction conditions being utilized, etc.

The applicable isotactic polybutylenes are relatively rigid while in their plastic form but flow readily upon being heated. As noted, they must exhibit a high molecular weight. Thus, expressing molecular weight in terms of "melt flow," the applicable istotactic polybutylenes to be used in these novel adhesives should exhibit a melt flow in the range of from 0.2 to 300, and preferably from 0.4 to 40.0. The latter melt flow values are determined by the method described in ASTM D 1236-62 Te and are inversely related to molecular weight, i.e. the lower the melt flow value, the higher the molecular weight. In addition, it should be noted that minor amounts, i.e. up to about 5% by weight, of alpha-olefin comonomers, such as ethylene and propylene, may be present in the butene-1 polymerization system without any substantial loss of the herein-described desirable properties displayed by the resultant essentially homopolymeric system.

The polybutylene may also contain up to 30 wt % polypropylene as a blend to modify melt index or adhesive properties.

The composition of the polybutylene employed herein is preferably of a film-forming grade, and can be obtained commercially from the Shell Chemical Company or prepared as described in U.S. Pat. No. 3,362,940. Preferably, the polybutylene has a melt index in the range of about 0.1 to about 500, and more preferably in the range of about 0.4 to about 7. Most preferably, the polybutylene has a melt index of about 1 to about 4.

The block copolymer of the present invention is well known in the art and is produced by conventional methods. The block copolymer is produced in geometric forms referred to as linear, branched and radial. Preferred methods of production of the block copolymers involve the use of a lithium polymerization initiator, particularly a lithium alkyl. U.S. Pat. No. 3,595,942 described block copolymers and methods of their production. Linear block copolymers are typically produced by sequential addition of suitable monomers into a polymerization reactor in the presence of the lithium alkyl initiator. The living polymer chain grows through sequential polymerization. Linear block copolymers are also illustratively produced by coupling of two living polymer chains with a difunctional coupling agent such as a dihaloalkane. Branched block copolymer structures are obtained through coupling of living polymers chains with a coupling agent having a functionality of three or more. Use of a coupling agent which is non-symmetrical results in block polymer of a structure termed branched. The precise nature of any coupling agent does not contribute substantially to the properties of the block copolymer and may be ignored so far as a description of the polymers is concerned.

The block copolymer has at least two blocks, designated A, of a polymerized vinyl aromatic compound and at least one block, designated B, of a polymerized conjugated alkadiene. The block copolymer has from about 8% by weight to about 55% by weight, preferably from about 10% by weight to about 30% by weight, of the polymerized vinyl aromatic compound blocks A with the remainder being polymerized alkadiene block B. Each of such A blocks will have an average molecular weight of from 5,000 to about 125,000, preferably from about 7,000 to about 60,000. Each B block will have an average molecular weight of from about 10,000 to about 300,000, preferably from about 30,000 to about 150,000.

The A blocks are produced by polymerization of a vinyl aromatic compound such as styrene or analogs or styrene such as $\alpha$-methylstyrene or ring methylated styrenes including p-methylstyrene and o-methylstyrene. The preferred vinyl aromatic compounds are styrene and $\alpha$-methylstyrene and particularly preferred is styrene.

A B block is preferably a homopolymeric block of butadiene or isoprene but copolymers with a vinyl aromatic compound are also suitable so long as the B block is predominantly conjugated alkadiene units. A particularly preferred non-hydrogenated B block is homopolymeric butadiene. In the case of butadiene, polymerization to give polymer units having a 1,2-structure or a 1,4-structure is possible. Preferred B blocks produced from butadiene have from about 35% to about 55% of units having a 1,2-structure with the remainder being units of a 1,4-structure.

Illustrative of the block copolymer precursors of the hydrogenated block copolymer blend components are block copolymers of the following types:
polystyrene-polybutadiene-polystyrene (SBS)
polystyrene-polyethylene-polybutadiene-polystyrene
polystyrene-polyisoprene-polystyrene (SIS)
poly($\alpha$-methylstyrene)polybutadiene-poly($\alpha$-methylstyrene)
poly($\alpha$-methylstyrene)polyisoprene-poly($\alpha$-methylstyrene).

The hydrogenated block copolymer is produced by substantially completely hydrogenation of the aliphatic unsaturation of the B block while very little of the aromatic unsaturation of the A blocks is effected. Such selective hydrogenation is conventional.

Hydrogenation of the block copolymer is effected in conventional manner by use of a catalyst formed by reaction of an aluminum alkyl with a nickel or cobalt carboxylate or alkoxide which serves to partially or selectively hydrogenate the block copolymer in that at least 80% of the aliphatic unsaturation is hydrogenated while hydrogenating no more than about 25% of the aromatic unsaturation. Preferably at least 99% of the aliphatic carbon-carbon double bonds while less than 5% of the aromatic unsaturation is hydrogenated. As stated, such selective hydrogenation is now conventional and is also illustrated by U.S. Pat. No. 3,595,942, as well as by U.S. Pat. No. Re 27,145. For a general description of block copolymers and their production before and after hydrogenation, see U.S. Pat. No. 4,111,895.

The hydrogenated block copolymers will have average molecular weights on the order of from about 25,000 to about 350,000. Preferred hydrogenated block copolymers have a molecular weight from about 35,000 to about 300,000. Such hydrogenated block copolymers are commercial and are sold by Shell Chemical Company under the tradename KRATON® G Thermoplastic Rubber.

The adhesives may further contain up to about 25% by weight, preferably 10-20% by weight, of a plasticizing or extending oil in order to provide wetting action and/or viscosity control. The above broadly includes the usual plasticizing oils such as paraffinic and naphthenic oils. The petroleum derived oils which may be employed are relatively high boiling materials containing only a minor proportion of aromatic hydrocarbons (preferably less than 30% and more particularly, less than 15% by weight of the oil). Alternatively, the oil may be totally nonaromatic.

Other additives such as plasticizers, pigments, dyestuffs, slip agents, or antiblock agents conventionally added to hot melt adhesives for various end uses contemplated may also be added in minor amounts into the formulations of the present invention.

Examples of the present invention are the following. As will become evident from the examples, the blends of the present invention will produce seals having a nearly constant peel strength over extended heat seal temperature ranges when used with a wide variety of container compositions.

EXAMPLES

Approximately ten pounds of each two component formulation was dry blended and is listed in Table 1.

TABLE 1

| FORMULA NO. | % BLOCK COPOLYMER | % POLY-BUTYLENE |
|---|---|---|
| 1 | 65 KRATON G1726X Rubber | 35 DP1560 |
| 2 | 70 KRATON G1726X Rubber | 30 DP1560 |
| 3 | 75 KRATON G1726X Rubber | 25 DP1560 |
| 4 | 100 KRATON G1726X Rubber | — |
| 5 | 70 KRATON G1726X Rubber | 30 PB1710 |
| 6 | 70 KRATON G1726X Rubber | 30 PB0300 |
| 7 | 65 KRATON D1102 Rubber | 35 DP1560 |
| 8 | 75 KRATON D1102 Rubber | 25 DP1560 |
| 9 | 100 KRATON D1102 Rubber | — |
| 10 | 65 KRATON D1107 Rubber | 35 DP1560 |
| 11 | 75 KRATON D1107 Rubber | 25 DP1560 |
| 12 | 100 KRATON D1107 Rubber | — |
| 13 | 75 KRATON D1107 Rubber | 25 PB0300 |
| 14 | 65 KRATON D1107 Rubber | 35 PB0300 |
| 15 | 75 KRATON D1107 Rubber | 25 PB1710 |
| 16 | 65 KRATON D1107 Rubber | 35 PB1710 |
| 17 | 65 KRATON D1111 Rubber | 35 DP1560 |
| 18 | 65 KRATON D1111 Rubber | 35 PB0300 |
| 19 | 65 KRATON D1111 Rubber | 35 PB1710 |
| 20 | 65 KRATON D1112 Rubber | 35 DP1560 |

TABLE 1-continued

| FORMULA NO. | % BLOCK COPOLYMER | % POLY-BUTYLENE |
| --- | --- | --- |
| 21 | 65 KRATON D1112 Rubber | 35 PB0300 |
| 22 | 65 KRATON D1112 Rubber | 35 PB1710 |
| 23 | 65 KRATON D1117 Rubber | 35 DP1560 |
| 24 | 65 KRATON D1117 Rubber | 35 PB0300 |
| 25 | 65 KRATON D1117 Rubber | 35 PB1710 |

KRATON ® G1726X rubber is a SEBS triblock copolymer with a 30 wt % sytrene content.
KRATON ® D1102 rubber is a SBS triblock copolymer with a 28 wt % styrene content.
KRATON ® D1107 rubber is a SIS triblock copolymer with a 14 wt % styrene content.
KRATON ® D1111 rubber is a SIS triblock copolymer with a 21 wt % styrene content.
KRATON ® D1112 rubber is a SIS triblock copolymer with a 14 wt % styrene content.
KRATON ® D1117 rubber is a SIS triblock copolymer with a 17 wt % styrene content.
DP1560 is a butene-1-ethylene copolymer containing 0.75% ethylene with a melt index of 4.0 which has been blended with 20 wt % polypropylene.
PB1710 is a butene-1-ethylene copolymer containing 0.75% ethylene and having a melt index of 1.0 which has been blended with 7 wt % polypropylene.
PB0300 is a homopolymer polybutylene with a melt index of 4.0.
All of the above polymers are available from Shell Chemical Company.

Except for the 100% KRATON rubber formulations (Nos. 4, 9 & 12) the formulations were melt compounded using a 1¼" Brabender extruder equipped with a two stage screw containing a Maddox mixing section at the end of the first stage. The extrusion conditions are listed below in Tables 2 and 2 A.

TABLE 2

| FORMULATIONS | 1 | 2 | 3 | 5 | 6 | 7* | 8* | 10* | 11* | 13 | 14 |
| --- | --- | --- | --- | --- | --- | --- | --- | --- | --- | --- | --- |
| ZONE 1 TEMP., °C. | 190 | 190 | 190 | 180 | 180 | 170 | 170 | 170 | 170 | 170 | 170 |
| ZONE 2 TEMP., °C. | 200 | 200 | 200 | 190 | 190 | 170 | 170 | 170 | 180 | 170 | 180 |
| ZONE 3 TEMP., °C. | 200 | 200 | 200 | 190 | 190 | 170 | 170 | 170 | 180 | 170 | 170 |
| ZONE 4 TEMP., °C. | 200 | 200 | 200 | 190 | 180 | 170 | 170 | 170 | 170 | 180 | 180 |
| MELT TEMP. °C. | 206 | 210 | 210 | 204 | 195 | 180 | 180 | 180 | 187 | 200 | 195 |
| RPM | 76 | 70 | 70 | 70 | 63 | 125 | 125 | 125 | 123 | 98 | 91 |
| BACK PRESSURE lbs. | 450 | 450 | 450 | 350 | 400 | 900 | 900 | 900 | 1000 | 700 | 600 |
| CUTTER FEED SETTING | 80 | 80 | 80 | 75 | 40 | 2 | 2 | 2 | 2 | 2 | 2 |
| BLADE SPEED SETTING | 90 | | 90 | 90 | 90 | 70 | | | | | |

*Used Cumberland pelletizer instead of "Farrs" customized pelletizer.

TABLE 2A

| FORMULATIONS | 15 | 16 | 17 | 18 | 19 | 20 | 21 | 22 | 23 | 24 | 25 |
| --- | --- | --- | --- | --- | --- | --- | --- | --- | --- | --- | --- |
| ZONE 1 TEMP | 170 | 170 | 170 | 170 | 170 | 170 | 170 | 170 | 170 | 170 | 170 |
| ZONE 2 TEMP | 170 | 170 | 170 | 170 | 170 | 180 | 170 | 170 | 170 | 170 | 170 |
| ZONE 3 TEMP | 170 | 170 | 170 | 170 | 170 | 180 | 170 | 170 | 170 | 170 | 170 |
| ZONE 4 TEMP | 180 | 180 | 180 | 180 | 180 | 180 | 180 | 180 | 180 | 180 | 180 |
| MELT TEMP | 196 | 195 | 200 | 200 | 200 | 204 | 205 | 205 | 199 | 203 | 203 |
| RPM | 80 | 80 | 125 | 125 | 125 | 90 | 110 | 110 | 102 | 105 | 108 |
| BACK PRESSURE | 600 | 600 | 500 | 700 | 900 | 600 | 600 | 600 | 500 | 500 | 500 |
| CUTTER*FEED SET | 2 | 2 | 3 | 3 | 3 | 3 | 3 | 3 | 2.5 | 2.5 | 2.5 |

*Used Cumberland Pelletizer.

All compounding extrusions were made using an 80/20 screen pack and a single strand die. The strand was double strung in a water bath so as to provide additional cooling time.

Approximately a one mil thick layer of the various blends was coextruded onto a 3 mil thick film of polypropylene 5C08, available from the Shell Chemical Company, using a three layer die. Polypropylene was extruded in both the Brabender and Haake extruders. The blends were extruded in the Killion extruder. Table 3 shows the extrusion conditions used for the polypropylene film extruded in the Brabender and Haake extruders and each of the blends which was extruded in the Killion extruder.

TABLE 3

| FORMULATION | EXTRUSION CONDITIONS | | | | | | | | | | | |
| --- | --- | --- | --- | --- | --- | --- | --- | --- | --- | --- | --- | --- |
| | 1 | 2 | 3 | 4 | 5 | 6 | 7 | 8 | 9 | 10 | 11 | 12 |
| BRABENDER ZONE 1, °C. | 190 | 190 | 190 | 190 | 190 | 190 | 190 | 190 | 190 | 190 | 190 | 190 |
| BRABENDER ZONE 2, °C. | 210 | 210 | 210 | 210 | 210 | 210 | 210 | 210 | 210 | 210 | 210 | 210 |
| BRABENDER ZONE 3, °C. | " | " | " | " | " | " | " | " | " | " | " | " |
| BRABENDER ZONE 4, °C. | " | " | " | " | " | " | " | " | " | " | " | " |
| BRABENDER DIE, °F. | " | " | " | " | " | " | " | " | " | " | " | " |
| BRABENDER ADAPTER, °F. | " | " | " | " | " | " | " | " | " | " | " | " |
| BRABENDER RPM | 29 | 29 | 29 | 29 | 29 | 29 | 29 | 29 | 29 | 29 | 29 | 29 |
| BRABENDER BACK PRES., lbs. | 1000 | 1000 | 1000 | 1000 | 1000 | 1000 | 1000 | 1000 | 1000 | 1000 | 1000 | 1000 |
| HAAKE ZONE 1, °C. | 180 | 180 | 180 | 180 | 180 | 180 | 180 | 180 | 180 | 180 | 180 | 180 |
| HAAKE ZONE 2, °C. | 210 | 210 | 210 | 210 | 210 | 210 | 210 | 210 | 210 | 210 | 210 | 210 |
| HAAKE ZONE 3, °C. | " | " | " | " | " | " | " | " | " | " | " | " |
| HAAKE ADAPTER, °C. | " | " | " | " | " | " | " | " | " | " | " | " |
| HAAKE RPM | 76 | 76 | 76 | 76 | 76 | 76 | 76 | 76 | 76 | 76 | 76 | 76 |
| HAAKE BACK PRES., lbs. | 900 | 900 | 900 | 900 | 900 | 900 | 900 | 900 | 900 | 900 | 900 | 900 |
| KILLION ZONE 1, °F. | 350 | 350 | 350 | 350 | 350 | 350 | 350 | 350 | 350 | 350 | 350 | 350 |
| KILLION ZONE 2, °F. | 400 | 400 | 400 | 400 | 400 | 400 | 360 | 350 | 350 | 350 | 350 | 350 |
| KILLION ZONE 3, °F. | 405 | 405 | 405 | 405 | " | " | " | 400 | 400 | 400 | 400 | 400 |
| KILLION ADAPTER, °F. | 400 | 400 | 400 | 400 | " | " | 370 | 375 | 375 | 375 | 375 | 375 |

TABLE 3-continued

| | EXTRUSION CONDITIONS | | | | | | | | | | | |
|---|---|---|---|---|---|---|---|---|---|---|---|---|
| FORMULATION | 1 | 2 | 3 | 4 | 5 | 6 | 7 | 8 | 9 | 10 | 11 | 12 |
| KILLION RPM | 23 | 24 | 24 | 27 | 27 | 27 | 30 | 42 | 39 | 42 | 42 | 45 |
| KILLION AMPS | 3.4 | 3.5 | 3.5 | 4.2 | 5.8 | 4.0 | 7.2 | 5.9 | 5.9 | 3.5 | 6.0 | 7.0 |
| KILLION MELT, °F. | 425 | 420 | 418 | 425 | 427 | 437 | 437 | 435 | 385 | 395 | 380 | 395 |
| KILLION BACK PRES., lbs. | 400 | 500 | 500 | 600 | 700 | 700 | 700 | 750 | 750 | 700 | 700 | 1100 |

Chill water temperature was set at 15° C., and an air knife was used for all runs.
Depending on film thickness measurement the chill roll speed was adjusted between 19.2 and 21.0 ft/min.
Formulations #4, 9 and 12 pellets were very sticky and required hand-feeding of the pellets into the Killion extruder feed section.

TABLE 3A

| | EXTRUSION CONDITIONS | | | | | | |
|---|---|---|---|---|---|---|---|
| FORMULATION | 13 | 14 | 15 | 16 | 17 | 18 | 19 |
| BRABENDER ZONE 1, °C. | 190 | 190 | 190 | 190 | 190 | 190 | 190 |
| BRABENDER ZONE 2, °C. | 210 | 210 | 210 | 210 | 210 | 210 | 210 |
| BRABENDER ZONE 3, °C. | " | " | " | " | " | " | " |
| BRABENDER ZONE 4, °C. | " | " | " | " | " | " | " |
| BRABENDER DIE, °F. | " | " | " | " | " | " | " |
| BRABENDER ADAPTER, °F. | " | " | " | " | " | " | " |
| BRABENDER RPM | 29 | 29 | 29 | 29 | 29 | 29 | 29 |
| BRABENDER BACK PRES., lbs. | 1000 | 1000 | 1000 | 1000 | 1000 | 1000 | 1000 |
| HAAKE ZONE 1, °C. | 180 | 180 | 180 | 180 | 180 | 180 | 180 |
| HAAKE ZONE 2, °C. | 210 | 210 | 210 | 210 | 210 | 210 | 210 |
| HAAKE ZONE 3, °C. | " | " | " | " | " | " | " |
| HAAKE ADAPTER, °C. | " | " | " | " | " | " | " |
| HAAKE RPM | 76 | 76 | 76 | 76 | 76 | 76 | 76 |
| HAAKE BACK PRES., lbs. | 900 | 900 | 900 | 900 | 900 | 900 | 900 |
| KILLION ZONE 1, °F. | 350 | 350 | 350 | 350 | 350 | 350 | 350 |
| KILLION ZONE 2, °F. | 400 | 400 | 400 | 400 | " | " | " |
| KILLION ZONE 3, °F. | " | " | " | " | " | " | " |
| KILLION ADAPTER, °F. | " | " | " | " | 400 | 400 | 400 |
| KILLION RPM | 28 | 28 | 30 | 30 | 20 | 20 | 20 |
| KILLION AMPS | 4.2 | 5.0 | 3.5 | 4.0 | 6.0 | 4.2 | 6.2 |
| KILLION MELT | 425 | 425 | 420 | 418 | 425 | 420 | 430 |
| KILLION BACK PRES. | 500 | 600 | 700 | 700 | 800 | 800 | 950 |
| FORMULATION | 20 | 21 | 22 | 23 | 24 | 25 | |
| BRABENDER ZONE 1, °C. | 190 | 190 | 190 | 190 | 190 | 190 | |
| BRABENDER ZONE 2, °C. | 210 | 210 | 210 | 210 | 210 | 210 | |
| BRABENDER ZONE 3, °C. | " | " | " | " | " | " | |
| BRABENDER ZONE 4, °C. | " | " | " | " | " | " | |
| BRABENDER DIE, °F. | " | " | " | " | " | " | |
| BRABENDER ADAPTER, °F. | " | " | " | " | " | " | |
| BRABENDER RPM | 29 | 29 | 29 | 29 | 29 | 29 | |
| BRABENDER BACK PRES., lbs. | 1000 | 1000 | 1000 | 1000 | 1000 | 1000 | |
| HAAKE ZONE 1, °C. | 180 | 180 | 180 | 180 | 180 | 180 | |
| HAAKE ZONE 2, °C. | 210 | 210 | 210 | 210 | 210 | 210 | |
| HAAKE ZONE 3, °C. | " | " | " | " | " | " | |
| HAAKE ADAPTER, °C. | " | " | " | " | " | " | |
| HAAKE RPM | 76 | 76 | 76 | 76 | 76 | 76 | |
| HAAKE BACK PRES., lbs. | 900 | 900 | 900 | 900 | 900 | 900 | |
| KILLION ZONE 1, °F. | 350 | 350 | 350 | 350 | 350 | 350 | |
| KILLION ZONE 2, °F. | " | " | " | " | " | " | |
| KILLION ZONE 3, °F. | " | " | " | " | " | " | |
| KILLION ADAPTER, °F. | 410 | 410 | 410 | 410 | 410 | 410 | |
| KILLION RPM | 20 | 20 | 20 | 20 | 22 | 20 | |
| KILLION AMPS | 3.0 | 3.0 | 3.0 | 3.0 | 2.8 | 2.5 | |
| KILLION MELT | 450 | 450 | 450 | 450 | 450 | 455 | |
| KILLION BACK PRES. | 700 | 700 | 700 | 350 | 300 | 250 | |

Chill water set at 15° C., and an air knife was used for all runs
Depending on film thickness measurement the chill roll speed was adjusted between 15.9 and 16.5 ft/min.

Each of the coated films was heat sealed to five mil thick high impact polystyrene film. All seals were made on a Packaging Industries, Inc. (Sentinel Machinery Div. Model No. 12-1249) heat sealer fitted with one inch wide jaws. Except for the sealing temperature all seals were made using "standard conditions" of 40 psi air pressure and a duration time of ½ second. The sealing temperatures were varied over a range of 350° F. to 450° F.

The term "peel sealability" refers to the sealed area of a film where the two parts are joined together. A film's peel sealability is measured by the amount of force which must be applied to peel the layers apart, such sealability can be measured by ASTM tensile strength testing method D-882 which was used in the Examples.

TABLE 4

| PEEL SEAL STRENGTH TO HIPS (LB/IN) SEALING TEMPERATURE | | | |
|---|---|---|---|
| FORMULATION | 350° F. | 400° F. | 450° F. |
| 1 | — | 1.36 | 1.48 |
| 2 | — | 1.48 | 2.35 |
| 3 | — | — | 1.92 |
| 4 | 0.70 | 1.30 | 1.01 |
| 5 | 0.72 | 0.73 | 1.11 |
| 6 | 1.27 | 1.45 | 1.79 |
| 7 | 0.31 | 0.57 | 1.82 |

TABLE 4-continued

| FORMULATION | PEEL SEAL STRENGTH TO HIPS (LB/IN) SEALING TEMPERATURE | | |
|---|---|---|---|
| | 350° F. | 400° F. | 450° F. |
| 8 | 0.70 | 2.01 | 3.47 |
| 9 | 1.30 | 3.08 | 3.22 |
| 10 | 2.93 | 2.73 | 3.54 |
| 11 | 1.73 | 1.71 | 2.43 |
| 12 | 2.07 | 3.06 | 3.47 |
| 13 | 2.17 | 2.36 | 2.50 |
| 14 | 0.38 | 1.47 | 0.92 |
| 15 | 1.60 | 2.09 | 2.63 |
| 16 | 1.09 | 2.74 | 2.64 |
| 17 | 1.10 | 1.44 | 1.95 |
| 18 | 0.20 | 1.39 | 2.15 |
| 19 | 0.10 | 0.10 | 0.40 |
| 20 | 0.51 | 0.76 | 0.93 |
| 21 | 0.52 | 0.69 | 0.96 |
| 22 | 0.59 | 0.71 | 1.03 |
| 23 | 0.44 | 0.66 | 0.77 |
| 24 | 1.45 | 0.71 | 1.33 |
| 25 | 0.44 | 0.76 | 1.00 |

Samples made from Formulation #6 and #10 were also heat sealed onto 10 mil plasticized clear PVC, HIPS, polypropylene homopolymer and high density polyethylene sheets under the above-mentioned sealing conditions. The peel seal strengths measured are shown in Tables 5 and 6.

TABLE 5

| PEEL SEAL STRENGTH OF FORMULATION #6 (LB/IN) | | | | | |
|---|---|---|---|---|---|
| HEAT SEAL TEMP. °F. | 325 | 350 | 375 | 400 | 425 |
| onto HIPS | 1.44 | 1.19 | 1.39 | 1.58 | 2.21 |
| onto PVC | 2.19 | 2.65 | 3.34 | 3.22 | — |
| onto HDPE | — | 2.38 | 2.88 | 6.78 | — |
| onto PP | — | 4.96 | 5.06 | 5.69 | — |

TABLE 6

| PEEL SEAL STRENGTH OF FORMULATION #10 (LB/IN) | | | | | |
|---|---|---|---|---|---|
| HEAT SEAL TEMP °F. | 325 | 350 | 375 | 400 | 425 |
| onto HIPS | 3.27 | 3.39 | 2.81 | 2.65 | 3.83 |
| onto PVC | 3.01 | 3.07 | 5.17 | 6.27 | — |
| onto HDPE | — | 3.59 | 4.39 | 5.09 | — |
| onto PP | — | 3.57 | 4.85 | 4.52 | — |

All seal strength data obtained on the experimental formulations significantly exceeded the minimum target value which is typical for commercial lidding stock.

In summary, it has been unexpectedly found by Applicant that the mixture of about 5 to 50 percent of a butene-1 homopolymer or copolymer, about 50 to 95 percent of a styrenic/olefinic block copolymer and 0 to about 30 percent polypropylene results in a unique film which has good peel seal strength, good processability and will bond by extrusion lamination to a polystyrene, PVC, or olefinic rigid container in a laminar structure without the need for an adhesive to achieve such bonding.

What is claimed is:

1. A new composition of matter for producing a peelable heat seal between substrates on which it is carried comprising a blend of:
   (a) about 5 to about 50 weight percent of polybutylene homopolymer or copolymer having a melt index of about 0.01 to about 1000;
   (b) about 50 to about 95 weight percent of a styrenic olefinic block copolymer; and optionally
   (c) 0 to about 30 percent by weight of polypropylene.

2. The composition of claim 1 which contains from about 10 percent by weight to about 40 percent by weight of said polybutylene homopolymer or copolymer; and
   from about 60 percent by weight to about 90 percent by weight of said styrenic/olefinic copolymer.

3. The composition of claim 1 wherein said polybutylene homopolymer or copolymer is a crystalline isotactic polybutylene having a melt index of about 0.4 to about 20.

4. The composition of claim 1 wherein said blend has a heat sealing temperature of about 70° C. to about 250° C.

5. The composition of claim 1 wherein said butene-1 polymer is a high molecular weight, flexible, crystalline, isotactic polymer having a density of about 0.91 and a melt index of about 0.4 to about 20.

6. The composition of claim 1, wherein the styrenic olefinic block copolymer is an A-B-A block copolymer wherein the A blocks are a monoalkenyl arene polymer block and the B block is a homopolymeric conjugated diene block.

7. The composition of claim 1, wherein the B block is polybutadiene.

8. The composition of claim 1, wherein the B block is polyisoprene.

9. The composition of claim 1, wherein the A block is styrene.

10. The composition of claim 1, wherein the A block is poly(α-methylstyrene).

11. The composition of claim 1, wherein the block copolymer has been hydrogenated so that at least 80% of the aliphatic unsaturation is hydrogenated while hydrogenating no more than about 25% of the aromatic unsaturation.

* * * * *